United States Patent
Williams

(10) Patent No.: US 7,762,683 B2
(45) Date of Patent: Jul. 27, 2010

(54) OPTICAL DEVICE WITH TILT AND POWER MICROLENSES

(75) Inventor: Darin S. Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 474 days.

(21) Appl. No.: 11/678,229

(22) Filed: Feb. 23, 2007

(65) Prior Publication Data

US 2008/0204731 A1    Aug. 28, 2008

(51) Int. Cl.
*F21V 5/00* (2006.01)
*G01C 3/08* (2006.01)

(52) U.S. Cl. ................................ 362/244; 356/4.01

(58) Field of Classification Search ............. 356/4.01; 362/244, 330, 329, 620, 619, 606, 607, 223–225
See application file for complete search history.

(56) References Cited

U.S. PATENT DOCUMENTS

| | | | | |
|---|---|---|---|---|
| 5,579,134 A | * | 11/1996 | Lengyel | ............... 349/62 |
| 6,033,094 A | * | 3/2000 | Sohn | ............... 362/332 |
| 7,220,038 B2 | * | 5/2007 | Yamashita et al. | ............... 362/606 |
| 2006/0291185 A1 | * | 12/2006 | Atsushi | ............... 362/29 |
| 2009/0040426 A1 | * | 2/2009 | Mather et al. | ............... 349/65 |

* cited by examiner

*Primary Examiner*—Isam Alsomiri
(74) *Attorney, Agent, or Firm*—Renner, Otto, Boisselle & Sklar, LLP

(57) ABSTRACT

A microlens array includes plural powered microlenses or microlens elements for tilting different light-emitting elements or portions of a light-emitting device. Each microlens or microlens element both has optical power, and adjusts the tilt of the wavefront so that in combination the individual microlenses act like a more complex multiple-element optic where each element shifts light from only a portion of the light-emitting device. Such an optical device may be incorporated into eyewear for projecting subtitles or other information above or below a far-away image, such as on a movie screen. Another potential use of the microlens array is for use in a heads-up display. Still another potential use for the microlens array to provide soft focusing of emitted laser light to achieve a target light spot of a desired diameter.

18 Claims, 3 Drawing Sheets

US 7,762,683 B2

OPTICAL DEVICE WITH TILT AND POWER MICROLENSES

BACKGROUND OF THE INVENTION

1. Field of the Invention

This invention relates to the field of optical devices.

2. Description of the Related Art

Head-mounted displays that allow an operator to remain focused on the far-field often require relatively precise and costly optics to direct, collimate, and image an entire display with a single set of optics. One proposal is a head-mounted display with an ear-mounted projector that projects onto a fold-down partially-reflective glass screen.

In a related problem, semi-active laser systems image across a relatively large field of view to a defocused image on a detector. In such systems laser scintillation may be a problem. There have been proposals to place a diffuser in front of a conventional optical train to limit scintillation.

From the foregoing it will be appreciated that improvements in optical systems would be desirable.

SUMMARY OF THE INVENTION

According to an aspect of the invention, a microlens array containing plural powered microlens elements that tilt and may collimate elements of incoming light.

According to another aspect of the invention, an optical device includes: a light-emitting device containing multiple light-emitting elements; and plural microlens elements having optical power, operatively coupled to the light-emitting device such that the microlens elements individually differently tilt wavefronts of light emitted by different of the light-emitting elements.

According to yet another aspect of the invention, a guidance system includes: a laser light source producing a laser light beam directed onto a target; and a plurality of microlens elements placed in the path of reflected light from the target, wherein the reflected light includes light reflected from the laser light beam. The microlens elements each tilt and shift focus of portions of the reflected light to produce a combined light spot with output light from the individual microlens elements overlapping.

According to still another aspect of the invention, a method of guiding a weapon to a target includes the steps of: reflecting a laser light beam off of the target; directing reflected light through an array of powered microlens elements, wherein the microlens elements individually tilt portions of the reflected light to cause overlapping of output light portions from the microlens elements; receiving at a sensor a combined light spot of the overlapped output portions; and using relative light intensities on photo detectors of the sensor to determine angular corrections in guiding the weapon.

According to a further aspect of the invention, a method of displaying information, the method comprising: receiving incoming light that includes multiple picture elements; and passing the incoming light through an optical device that differently collimates and tilts light emitted by different of the light-emitting elements.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A microlens array includes plural powered microlenses or microlens elements for tilting different light-emitting elements or portions of a light-emitting device. Each microlens or microlens element both has optical power, and adjusts the tilt of the wavefront so that in combination the individual microlenses act like a more complex multiple-element optic where each element shifts light from only a portion of the light-emitting device. The microlenses are configured with optical power, to tilt the light emitted and to provide desired focusing of the light. In one embodiment, such as for use in a display, the powered microlenses may be used to tilt and collimate light from a display in order to achieve a desired effective focusing distance for the emitted light. For example, the microlenses may be used to make displayed information, such as text, require the same focusing of a user's eyes as far-away objects, such as on a movie screen. Such an optical device may be incorporated into eyewear for projecting subtitles or other information above or below a far-away image, such as on a movie screen.

Another potential use of the microlens array is for use in a heads-up display, such as is employed in a vehicle like an aircraft or a land vehicle. Still another potential use for the microlens array to provide soft focusing of emitted laser light to achieve a target light spot of a desired diameter.

Figure 1A:
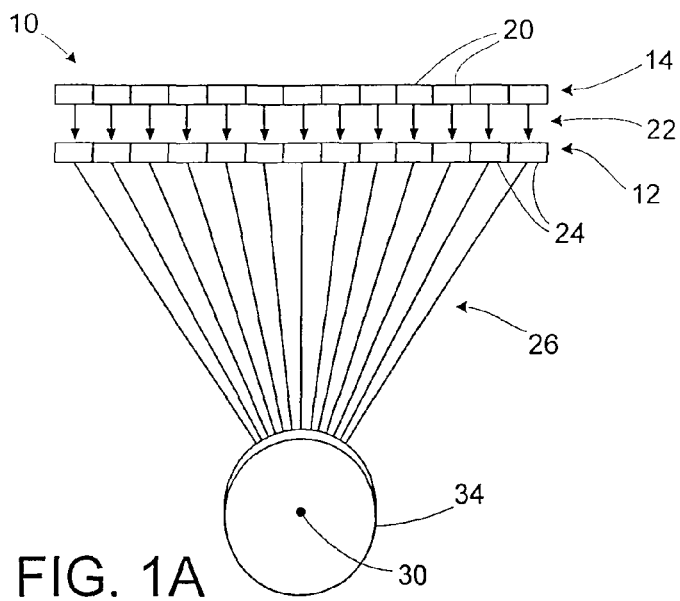
FIG. 1A is a schematic view of an optical device in accordance with an embodiment of the present invention.

FIG. 1A shows an optical device 10 that includes a microlens array 12 for altering light emitted by a light-emitting device 14. The light-emitting device 14 includes an array of light-emitting elements 20. The light-emitting elements 20 may be pixels of a display such as a light-emitting diode (LED) display, including backlit displays with light modulators. The light-emitting elements 20 may be individual separate elements of the light-emitting display 14. Alternatively, the light-emitting elements 20 may be portions of one or more larger sections of the light-emitting device 14. Light rays 22 emitted by the light-emitting elements 20 are tilted by powered microlens elements 24 of the microlens array 12. The microlens elements 24 are powered in that they have optical power, the property of converging or diverging incident light by bending the light. The powered microlens elements 24 may also individually collimate the light from the light-emitting elements 20, causing the light to appear as if from an object far away from the user. The tilted and collimated light rays 26 are directed toward a focal point 30, such as in an eye 34 of a user of the optical device 10. The powered microlens elements 24 collimate the incoming light rays 22 to make the output light rays 26 parallel to one another, in the sense of focusing to the same point. This simulates the behavior the emitted light rays 22 would have if they were at a distance far from the eye 34. That is, the microlens array 12 causes the light 22 from the light-emitting device 14 to be transformed so that the eye 34 of the user must focus on the light rays 26 as if the light rays 26 were from an object far away from the eye 34. In addition, the microlens elements 24 tilt and focus the light rays 22. This may be done with prisms or other suitable optical techniques. It will be appreciated that the focusing of each of the microlens elements 24 may be done by suitably shaping the microlens element 24.

Figure 1B:
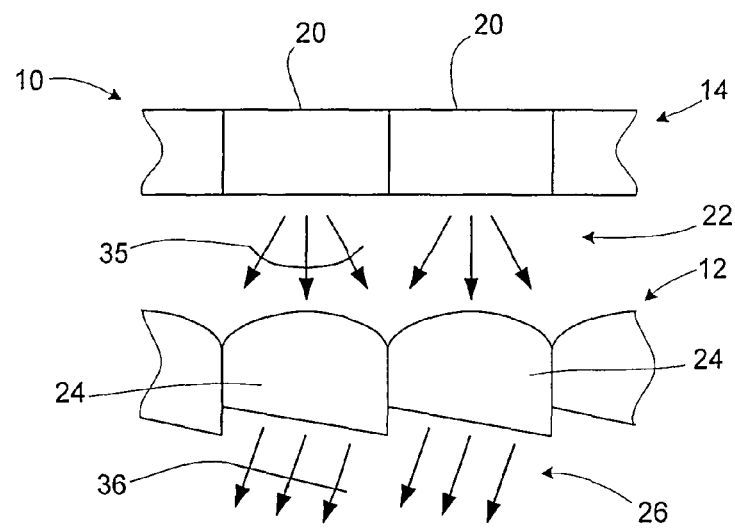
FIG. 1B is a detailed view of a portion of the optical device of FIG. 1A.

FIG. 1B shows a detailed view of a portion of the optical device 10. The light rays 22 from the individual light-emitting elements 20 initially spreads out in a cone away from the light-emitting elements. The portion of this light 22 that reaches the powered microlens elements 24 is tilted in a new direction for each of the elements, toward the user's eye 34 (FIG. 1A) is focused to an extent by the optical power of the microlens elements 24. Separate tilt and power (in this case, collimate and tilt) microlenses or microlens elements 24 collect light from each display pixel, and send it on its own unique collimated path toward the user's eye. By making the output light rays 26 parallel to each other, or nearly parallel to each other, the output light rays 26 appear to the user to be from a system much farther from the user than the actual location of the light-emitting device 14. The shape of the wavefront of the light goes from a curved wavefront shape 35 for the light 22, to a nearly straight wavefront shape 36 for the output light 26.

Figure 1C:
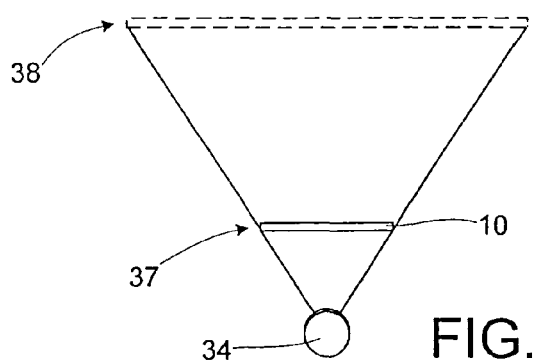
FIG. 1C is a schematic view illustrating the difference between actual and apparent locations of the optical device of FIG. 1A.

It will be appreciated that a different eye focus is required for the user to focus on a curved wavefront as opposed to a nearly straight wavefront. With reference now to FIG. 1C, a curved wavefront corresponds to a near location 37 close to the user. The optical device 10 is actually located at the near location 37, and if the microlens array 12 (FIG. 1A) was not present, the user would have to focus his or her eyes on a near-field location in order to focus on light from the light-emitting device 14 (FIG. 1A). With the microlens array 12 present, the curvature of the wavefront is greatly reduced (if not altogether eliminated), and the user focuses essentially at infinity in order to see the light clearly. This far-field or infinite focus corresponds to the user eye focus required for other objects in his or her field of vision. Thus the user is able to use a single eye focus for both the light-emitting device 14 and objects much farther from the user than the light-emitting device 14. In essence, the light-emitting device 14 appears to the user at a far location 38. This is because the user uses a far-field focus to accurately observe the output light 26 (FIG. 1A) from the optical device 10. As perceived by the user, the optical device 10 is not only much farther away than its actual location, but also the optical device 10 is perceived as much larger than its actual size.

The microlens array 12 may be made of glass, or any of a wide variety of suitable optical plastics, resins, or other suitable materials. Suitable optical plastics are an example of a suitable material for the microlens array 12. The microlens array 12 may be a single piece of material, for example being a stamped or molded single piece of plastic. It will be appreciated that alternatively the microlens array 12 may be made of multiple pieces of material.

The microlenses or microlens elements 24 may be sized to correspond to the size of the individual light-emitting elements 20. Of course it will be appreciated that the microlenses or microlens elements 24 may be larger or smaller than the individual light-emitting elements 20.

The light from the light-emitting elements 20 may have a sufficiently narrow band of wavelength so as to avoid unacceptable chromatic aberration. It will be appreciated that this is not a problem for creating full-color displays. As with a conventional color monitor, each dot (element) of this display 14 may be a single color. The corresponding microlens or microlens elements 24 may be configured to tilt and focus (or collimate) only a single color. It may be advantageous to utilize the microlens array 12 in conjunction with an LED display as a light-emitting device. An LED display emits a narrower band of light than phosphor displays do.

The optical device 10 advantageously allows a user to focus on a close-in array as if the array were far away from the user. This allows the user to focus both on the light-emitting device 14 and on other objects that may be in a far-away focus field in the user's field of vision. The optical device 10 also advantageously allows light from the light-emitting display 14 to be focused towards a narrower part of the field of vision of the user. For example the light rays 26 may be directed to the center of the user's cornea when the fovea (the high resolution part of the eye) is pointed at a target object, either the display or some other object. This minimizes aberrations in viewing the light ray 26 from the optical device 10. This control of aberrations is consistent with the shift of apparent focus, such as to substantially infinite focus, provided by the microlens elements 24.

Figure 2A:
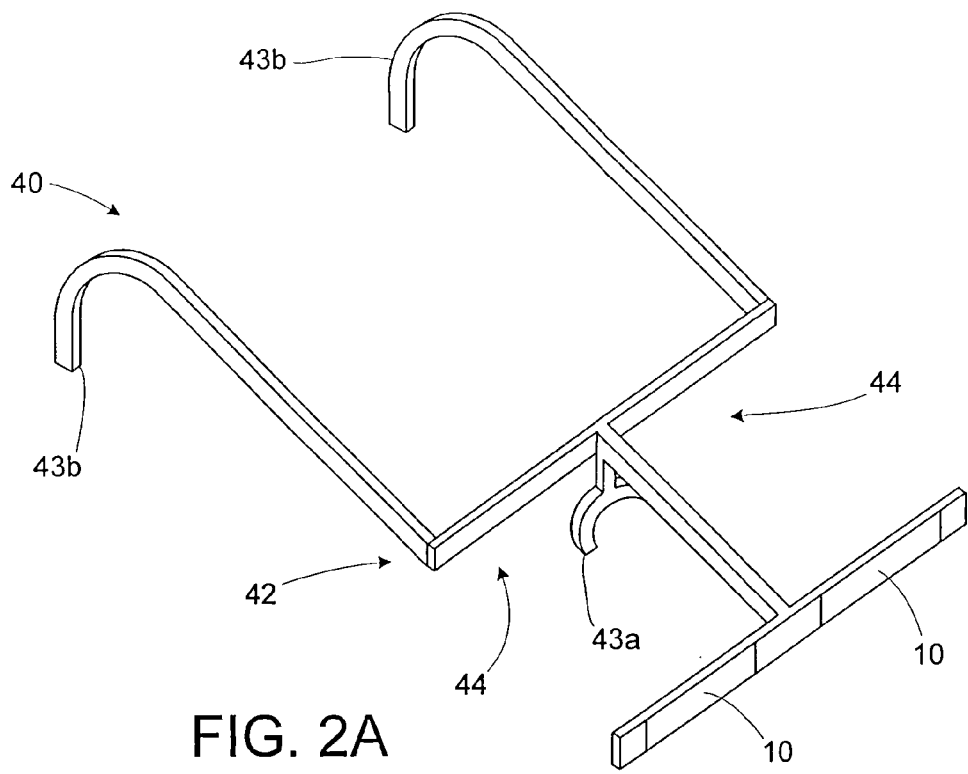
FIG. 2A is an oblique view of eyewear incorporating an embodiment of the optical device of FIG. 1A.

The optical device 10 may be used in any of a wide variety of circumstances in which it is desirable to change the apparent focusing characteristics of light from the light-emitting device 14. One example, shown in FIG. 2A, is a head-mounted display device 40, such as eyewear 42. The eyewear 42 is a pair of glasses, with a nosepiece 43a and a pair of earpieces 43b, with one or more of the optical devices 10 placed a few inches in front of the viewer's eyes. The optical devices 10 may be placed within the field of vision of a wearer, but above or below an open primary visual area 44 (straight ahead view or line of sight) of the user. The optical devices 10 may be used for displaying text or other information in such a way that the user is able to bring into focus both objects seen through the primary visual area 44 and light from the optical devices 10. One possible use for the eyewear 42 is to display subtitles or closed captioning for use by viewers of movies or opera performances, for example. With the optical devices 10 able to provide light that is collimated and tilted to provide a far-field focus, the user is able to focus on both the main visual information, seen directly through the primary visual area 44, and the auxiliary information from the optical devices 10. The information from the optical display 10 would appear to "float" at the top of the user's field of vision. It will be appreciated that the eyewear 42 may provide an inexpensive way for providing auxiliary information in such a way that a user may focus both on far away objects, seen in a normal visual path, and secondary information such as subtitles or captioning. Some link, either a wired or wireless link, may be provided to allow appropriate displaying of information in the optical devices 10 in coordination with primary visual information (such as a movie or an opera performance) seen by the user.

Figure 2B:
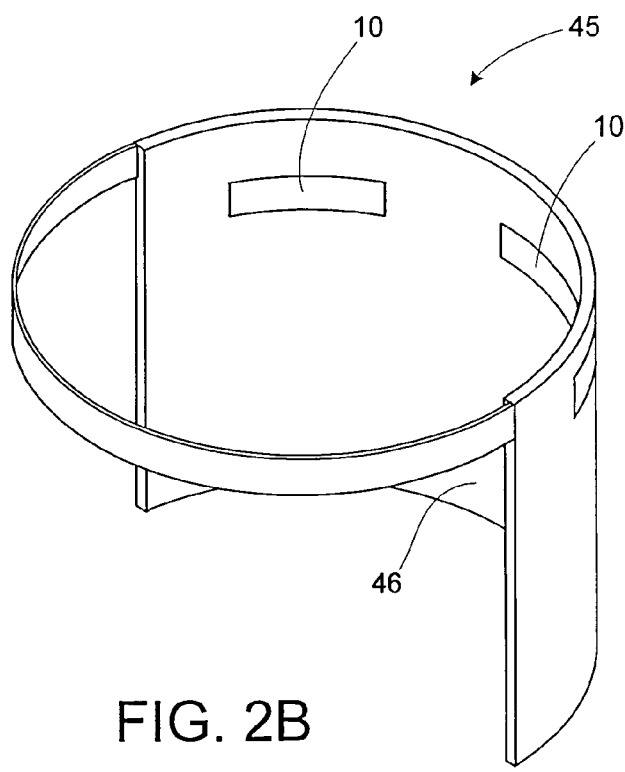
FIG. 2B shows an oblique view of another viewer-mounted display incorporating an embodiment of the optical device of FIG. 1A.

FIG. 2B shows another head-mounted display system 45 that incorporates the optical device 10. The system 45 may be a helmet or face covering that blocks a wide portion or substantially all of the user's field of vision. A main display screen 46 of the system 45 may show an image presenting a real or virtual scene a few inches away from the eyes of the viewer. As one example, the screen 46 may display a movie. The optical device 10 displays information at a suitable location, for example at the top of the user's field of vision for example at the top of or above the screen 46. The optical device 10 provides a simple and rugged system for displaying information.

Optionally, the head-mounted display 45 may be configured so that the main view is changed as the user turns or tilts his or her head. The optical device 10 maintains display of the same information as the user turns and/or tilts his or her head. In some applications having the images move with the user's head could be disorienting. This is easily overcome by measuring head motion using any of a variety of commercially available sensors, and moving the image on the display screen 46 to make the image appear stable in space.

Figure 3:
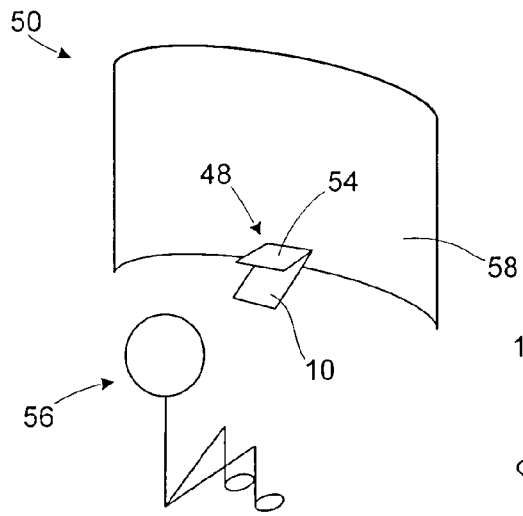
FIG. 3 is a schematic view of a vehicle that includes a heads-up display that incorporates an embodiment of the optical device of FIG. 1A.

FIG. 3 shows the optical device 10 as part of a heads-up display (HUD) 48. The HUD 48 may be part of a vehicle 50. The HUD 48 allows display of text, pictorial, or other visual information within the field of view of an operator 56 of the vehicle 50. The HUD 48 includes the optical device 10 and a partial mirror 54. Light emitted by the optical device 10 may be bounced off of the mirror 54 and into the primary field of vision of the user or operator 56. The operator's primary field of view may be out of a window or windshield 58, with the information from the HUD 48 appearing to float over the scene outside the window. It will be appreciated that the optical device 10 advantageously provides collimated light output that requires similar focus by the user (such as focus at a substantially infinite field of view) similar to that of objects seen out of the window or windshield 58. Thus there may be no need for the operator to refocus his or her vision when transferring attention from objects in the primary field of view to information displayed by the HUD 48 and vice-versa.

It will be appreciated that the vehicle 50 may be any of a wide variety of vehicles, such as aircraft, land vehicles such as automobiles, or sea vehicles. It will also be appreciated that the HUD 48 may be utilized in a wide variety of situations other than in vehicles. Use of the HUD 48 is advantageous whenever it is desirable to place visual information at a desired focus within a field of view of the user.

It also will be appreciated that the microlens projection element optical device 10 does not necessarily have to be placed directly in the user's line of sight. It may be relayed through the eye through a flat or powered optic, for example a powered relay mirror, either blocking portions of the user's field of view (FOV), as in FIG. 2B, or mixed with it as in FIGS. 2A and 3. The microlens projection element optical device 10 thus may operate in conjunction with another optic. In doing so, the functions of microlens projection element optical device 10 may include correcting aberrations in that additional optic.

It will be appreciated that the optical device 10 may be utilized in a wide variety of other situations. The optical device 10 may be combinable with other optical elements, such as flat or powered mirrors, or with other powered elements, to provide flexibility in terms of usage and application.

Figure 4:
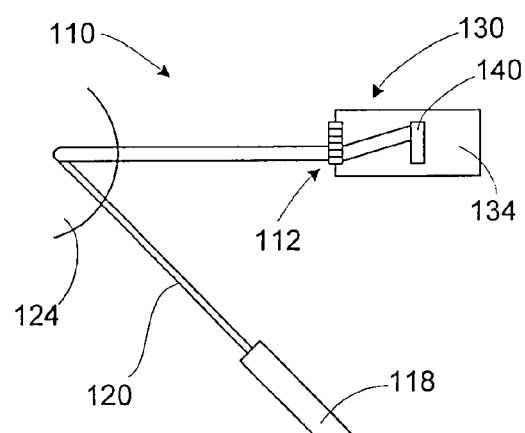
FIG. 4 is a schematic view of a laser guidance system that includes an embodiment of the optical device of FIG. 1A.
Figure 5:
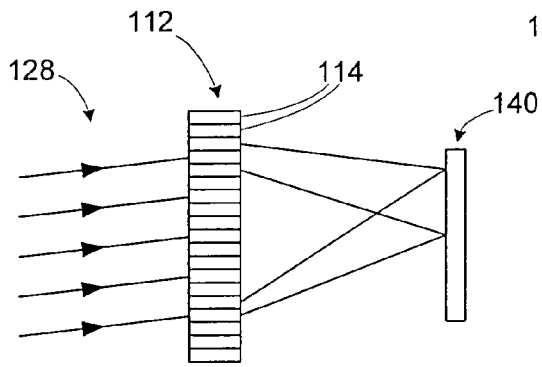
FIG. 5 is a schematic side view of a portion of the system of FIG. 4.
Figure 6:
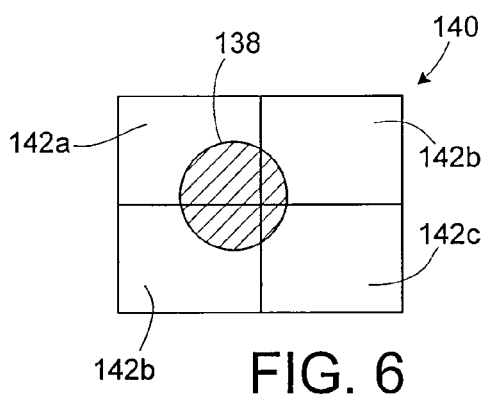
FIG. 6 is a schematic top view of a quad detector of the system of FIG. 4.

FIGS. 4-6 illustrate another use for a microlens array 112, as part of a laser guidance system 110. The laser guidance system 110 includes a laser source 118 that directs laser light beam 120 at a target 124. The target 124 reflects the laser light 120. A portion of the reflected light 128 finds its way to a guidance sensor 130 of a weapon 134, such as a missile that is to be guided to the target 124.

The reflected light 128 may be used to determine angle corrections for guiding the weapon 134 to the target 124. With reference now in particular to the details shown in FIG. 5, the reflected light 128 reaches the microlens array 112.

In a conventional system this incoming light is soft-focused on the image plane, so that light from a single point in the far field focuses to an extended spot on the detector. This is to allow a quad-cell type detector to perform angle measurements. The difficulty is that coherent light, such as from the reflected laser, tend to scintillate when soft focused. This problem can be overcome by using microlens elements 114 in place of conventional optics. Each element 114 tilts and softly focuses part of the reflected light 128 onto a combined target spot 138 having a desired size. The light output from the elements 114 overlaps within the combined target spot 138. Each of the overlapping light outputs from the elements 114 may overlap substantially all of the combined spot 138. Because the different portions of the incoming wavefront are mixed separately, the scintillation is largely removed.

The target spot is directed to a quad array 140, shown in FIG. 6, which has the combined spot 138 located along one or more photo detectors 142a-142d of the quad detector 140. As is well known, the relative light intensities on the photo detectors 142a-142d may be used to determine angular corrections in guiding the weapon 134 to the target 124.

The use of the microlens array 112 in the laser guidance system 110 advantageously avoids the use of conventional optical lenses, which are used in prior semi-active laser guidance systems. It will be appreciated that the guidance system 110 may include other elements, for example, band pass filters for filtering out all but a desired range of frequency of light.

Advantageously, the combined target spot 138 avoids undesirable scintillation and speckle effects in prior semi-active laser guidance systems. Effects of aberrations are also reduced.

The microlens elements 114 may be on the order of the correlation length of the returned laser wavefront or smaller, in order to aid in cancelling scintillation.

Figure 7:
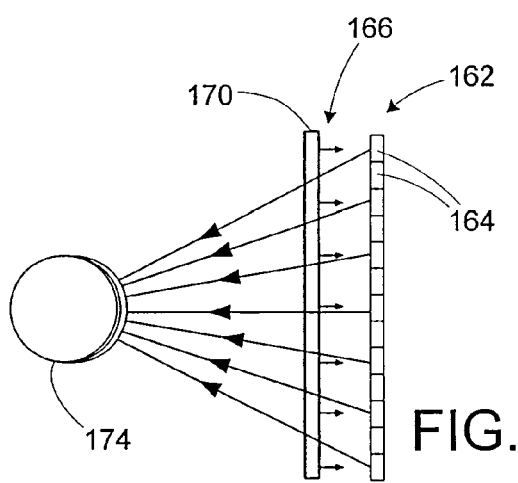
FIG. 7 is a schematic view of a reflective optical device in accordance with an embodiment of the present invention.

FIG. 7 shows an alternative to the refractive microlens arrays 12 and 112 described above, a reflective microlens array 162. The reflective microlens array 162 includes reflective microlens elements 164 that tilt and collimate light 166 produced by a light emitting display 170. The reflective elements 164 may reflect the light in a direction into or out of the plane shown in FIG. 7, causing the reflected light to pass by the light emitting display 170. In a manner analogous to that of the microlens arrays 12 and 112 described above, the reflective microlens array 162 tilts and collimates the light, directing it to a desired focal point, such as within an eye 174 of a user.

It will be appreciated that a diffractive microlens array may be used as another alternative to the refractive microlens arrays. The diffractive microlens array would have a configuration similar to that of the microlens array 12 (FIG. 1A) described above.

The microlens array advantageously breaks up a lens into a set of elements that both have optical power and adjust the tilt of the incoming light wavefront. In combination the individual microlenses act alike a more complex multiple-element optic where each element acts on an individual light-emitting element. In a convention system all optical elements affect all display elements (or pixels).

It will be appreciated that the various powered microlens arrays described herein advantageously tilt and otherwise affect different parts of incident light in different ways. Although for illustration purposes the microlens arrays have generally been shown as varying tilt in only a single dimension, it will be appreciated that in general the microlens arrays may have elements of any suitable shape, for instance having square elements varying tilt in two dimensions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical device comprising:
    a light-emitting device containing multiple light-emitting elements; and
    plural microlens elements having optical power, operatively coupled to the light-emitting device such that the microlens elements individually differently tilt wavefronts of light emitted by different of the light-emitting elements;
    wherein the microlens elements tilt the light of the light-emitting elements substantially toward a single focal point.

2. The optical device of claim 1, wherein the microlens elements are parts of a single piece of material.

3. The optical device of claim 2, wherein the single piece of material is a stamped plastic piece.

4. The optical device of claim 1, wherein the microlens elements are refractive elements.

5. The optical device of claim 1, wherein the microlens elements shift apparent focus of the light from the light-emitting device.

6. The optical device of claim 5, wherein the microlens elements shift the apparent focus substantially to infinity.

7. The optical device of claim 1, wherein the light-emitting device and the microlens elements are incorporated into a head-mounted device.

8. The optical device of claim 1, wherein the light-emitting device and the microlens elements are parts of a heads-up display device.

9. The optical device of claim 1, wherein the light-emitting device is a light emitting diode display.

10. The optical device of claim 1, wherein the microlens elements collimate portions of the light emitted by different of the light-emitting elements.

11. The optical device of claim 10, wherein the microlens elements tilt and collimate the light from each of light-emitting elements, sending the light from each of the light-emitting elements on its own unique collimated path.

12. The optical device of claim 11, wherein the microlens elements alter the wavefronts from curved wavefronts to substantially straight wavefronts.

13. The optical device of claim 1, wherein in combination the microlens elements act as a more complex multiple-element optic.

14. The optical device of claim 1, wherein the microlens elements alter the wavefronts from curved wavefronts to substantially straight wavefronts.

15. A method of optical display, the method comprising:
    emitting light from multiple light-emitting elements of a light-emitting device; and
    individually differently tilting wavefronts of the light emitted by different of the light-emitting elements using plural microlens elements having optical power;
    wherein the tilting includes tilting the light of the light-emitting elements substantially toward a single focal point.

16. The method of claim 15, wherein the tilting includes shifting apparent focus of the light substantially to infinity.

17. The method of claim 15, wherein the tilting includes the microlens elements collimating portions of the light emitted by different of the light-emitting elements.

18. The method of claim 15, wherein the tilting includes altering the wavefronts from curved wavefronts to substantially straight wavefronts.

* * * * *